United States Patent [19]
Rathbun

[11] Patent Number: 5,706,095
[45] Date of Patent: Jan. 6, 1998

[54] APPARATUS AND METHOD FOR MEASURING PERCENTAGE SOLIDS IN LIQUID DEVELOPER MATERIAL

[75] Inventor: Darrel R. Rathbun, Ontario, N.Y.

[73] Assignee: Xerox Corporation, Stamford, Conn.

[21] Appl. No.: 714,667

[22] Filed: Sep. 16, 1996

[51] Int. Cl.⁶ ............................................. G01N 21/47
[52] U.S. Cl. ..................................... 356/446; 399/57
[58] Field of Search ............................ 399/28, 29, 57; 356/446

[56] References Cited

U.S. PATENT DOCUMENTS

| | | | |
|---|---|---|---|
| 4,119,989 | 10/1978 | Carvalko et al. | 399/57 |
| 4,524,088 | 6/1985 | Fagen, Jr. et al. | 427/10 |
| 4,950,905 | 8/1990 | Butler et al. | 250/358.1 |
| 5,162,874 | 11/1992 | Butler | 356/446 |
| 5,204,537 | 4/1993 | Bennet et al. | 250/560 |
| 5,512,978 | 4/1996 | Mosher et al. | 399/57 |

Primary Examiner—Frank G. Font
Assistant Examiner—Zandra V. Smith
Attorney, Agent, or Firm—Gary B. Cohen

[57] ABSTRACT

A system for measuring a percentage of the solids in a liquid developer material is provided. The liquid developer material is received by a liquid developer material application member for application of the liquid developer material to a selected surface. The liquid developer material, when disposed on the developer application member as a film, is characterized by a first value varying as a function of developed mass per unit area (DMA) and a second value varying as a function of film thickness. The measuring system includes: a first sensing system for determining a magnitude corresponding with the first value; a second sensing system for determining a magnitude corresponding with the second value; and a controller, responsive to the first and second sensing systems, for determining the percentage of the solids in the liquid developer material with the determined first and second values.

11 Claims, 8 Drawing Sheets

APPARATUS AND METHOD FOR MEASURING PERCENTAGE SOLIDS IN LIQUID DEVELOPER MATERIAL

BACKGROUND OF THE INVENTION

This invention relates generally to a printing system employing a development subsystem and, more particularly, to a sensing arrangement adapted for use with the development subsystem for facilitating highly accurate measurement of percentage solids in liquid developer material.

Generally, the process of electrostatographic copying is initiated by exposing a light image of an original document to a substantially uniformly charged photoreceptive member. Exposing the charged photoreceptive member to light in an imagewise configuration discharges the photoconductive surface thereof in areas corresponding to non-image areas in the original input document while maintaining charge in image areas, resulting in the creation of a latent electrostatic image of the original document on the photoreceptive member. This latent image is subsequently developed into a visible image by a process in which developer material is deposited onto the surface of the photoreceptive member. Typically, this developer material comprises carrier granules having toner particles adhering triboelectrically thereto, wherein the toner particles are electrostatically attracted from the carrier granules to the latent image for forming a developed powder image on the photoreceptive member. Alternatively, liquid developer materials comprising a liquid carrier having toner particles immersed therein have been successfully utilized, wherein the liquid developer material is applied to the photoconductive surface with the toner particles being attracted toward the image areas of the latent image to form a developed liquid image on the photoreceptive member. Regardless of the type of developer material employed, the toner particles of the developed image are subsequently transferred from the photoreceptive member to a copy substrate, either directly or by way of an intermediate transfer member. Thereafter, the image may be permanently affixed to the copy substrate for providing a "hard copy" reproduction or print of the original document or file. In a final step, the photoreceptive member is cleaned to remove any charge and/or residual developing material from the photoconductive surface in preparation for subsequent imaging cycles.

The above described electrostatographic reproduction process is well known and is useful for light lens copying from an original as well as for printing applications involving electronically generated or stored originals. Analogous processes also exist in other printing applications such as, for example, digital laser printing where a latent image is formed on the photoconductive surface via a modulated laser beam, or ionographic printing and reproduction where charge is deposited on a charge retentive surface in response to electronically generated or stored images. Some of these printing processes develop toner on the discharged area, known as DAD, or "write black" systems, as distinguished from so-called light lens generated image systems which develop toner on the charged areas, also known as CAD, or "write white" systems. The subject invention applies to both such systems.

It has become highly desirable to provide the capability of producing color output prints through the use of electrostatic printing processes. As such, a so-called subtractive color mixing process has been developed for use in electrostatographic printing machines to produce a multicolor output image, whereby a full gamut of colors are created from three colors, namely cyan, magenta and yellow. These colors are complementary to the three primary colors, with various wavelengths of light being progressively subtracted from white light.

The use of liquid developer materials in imaging processes is well known. Likewise, the art of developing electrostatographic latent images formed on a photoconductive surface with liquid developer materials is also well known. Indeed, various types of liquid developing materials and development systems have heretofore been disclosed with respect to electrostatographic printing machines.

Liquid developers have many advantages, and often produce images of higher quality than images formed with dry toners. For example, images developed with liquid developers can be made to adhere to paper without a fixing or fusing step, thereby eliminating a requirement to include a resin in the liquid developer for fusing purposes. In addition, the toner particles can be made to be very small without the resultant problems typically associated with small particle powder toners, such as airborne contamination which can adversely affect machine reliability and can create potential health hazards. The use of very small toner particles is particularly advantageous in multicolor processes wherein multiple layers of toner generate the final multicolor output image. Further, full color prints made with liquid developers can be processed to a substantially uniform finish, whereas uniformity of finish is difficult to achieve with powder toners due to variations in the toner pile height as well as a need for thermal fusion, among other factors. Full color imaging with liquid developers is also economically attractive, particularly if surplus liquid carrier containing the toner particles can be economically recovered without cross contamination of colorants.

In a printing system using liquid development, it is common to apply liquid developer to a photoreceptor by way of an application roller upon which a layer of the liquid developer is maintained. As is known, the liquid developer is characterized by a percentage of solids. As follows from the prior art, a value of percentage solids depends on the ratio of toner mass to total liquid developer mass. Toner mass varies as a function of toner mass per unit area ("DMA") and total liquid developer mass varies as a function of the thickness of the liquid developer ("film thickness").

In one example, DMA is measurable with a sensing arrangement of the type described by U.S. Pat. No. 4,950,905 to Butler et al. ("Butler"), the disclosure of which is incorporated herein by reference. The non-black colored toner DMA sensor arrangement of Butler includes a light emitting device for illuminating a toner/surface substrate with light of a wavelength to which colored toners are non-absorbing, and to which an imaging surface is either partially absorbing or transmissive. Light is reflected from the toner predominantly by either scattering or multiple reflections to produce a significant component of diffusely reflected light. A sensor is arranged for detection of the diffusely reflected light, at an angle that does not detect the specularly reflected component of reflected light. An increasing level of diffusely reflected light indicates an increased density of toner coverage per unit area.

In another example, film thickness is obtainable through use of developer thickness control system of the type disclosed in U.S. Pat. No. 4,524,088 to Fagen, Jr. et al. (Fagen), the disclosure of which is incorporated herein by reference. Fagen discloses a technique in which developer thickness is obtained with an arrangement including a capacitive sensing subsystem communicating with suitable processing circuitry. Developer is provided to the application by way of an actuator, such as a motor. As shown, the capacitive sensing subsystem is defined by a surface of an application roller and a bar spaced from the surface by a distance "d". The circuitry develops a train of pulses which are repetitive at a fixed frequency, and the duty cycle of which varies in accordance with the capacitance which is detected by the capacitive sensing subsystem. By virtue of the change of the capacitance into an electrical signal of varying duty cycle, the extremely small capacitance change may be used to develop an electrical signal of significant magnitude which may readily be used to control the supply of the developer by turning the actuator on and off.

It has been found that optimum development is facilitated by, among other things, maintaining the percentage solids at a selected level. The monitoring of percentage solids can be reasonably intensive, from both a structural and procedural point of view since various parameters must be determined in accessing the ratio of toner mass and total ink mass. It would be desirable to provide a percentage solids monitoring arrangement that determines percentage solids in a simple way with a minimum amount of hardware and attendant procedure.

SUMMARY OF THE INVENTION

In accordance with the present invention, there is provided a system for measuring a percentage of the solids in a liquid developer material. The liquid developer material is received by a liquid developer material application member for application of the liquid developer material to a selected surface. The liquid developer material, when disposed on the developer application member as a film, is characterized by a first value varying as a function of developed mass per unit area (DMA) and a second value varying as a function of film thickness. The measuring system includes: a first sensing system for determining a magnitude corresponding with the first value; a second sensing system for determining a magnitude corresponding with the second value; and a controller, responsive to the first and second sensing systems, for determining the percentage of the solids in the liquid developer material with the determined first and second values.

DESCRIPTION OF THE PREFERRED EMBODIMENT(S)

While the present invention will hereinafter be described in connection with a preferred embodiment thereof, it will be understood that it is not intended to limit the invention to that embodiment. On the contrary, it is intended to cover all alternatives, modifications and equivalents as may be included within the spirit and scope of the invention as defined by the appended claims.

Figure 1:
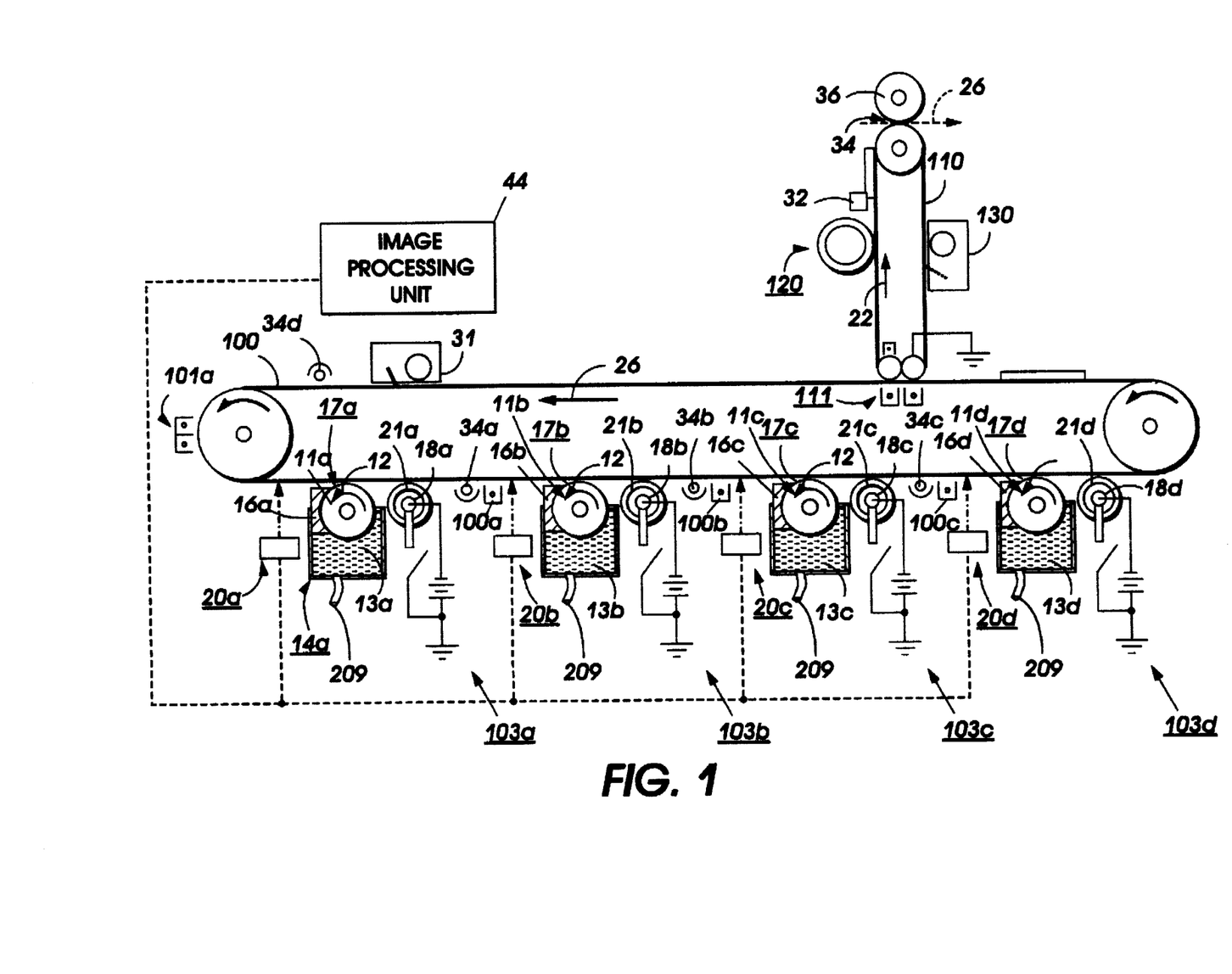
FIG. 1 is an elevational, partially schematic view of a printing system employing liquid ink development.

For a general understanding of the features of the present invention, reference numerals have been used throughout to designate identical elements. FIG. 1 schematically depicts the various elements of an illustrative color electrophotographic printing machine incorporating the present invention therein. It will become evident from the following discussion that the present invention is equally well suited for use in a wide variety of printing machines and is not necessarily limited in its application to the particular embodiment depicted herein.

Inasmuch as the art of electrophotographic printing is well known, the various processing stations employed in the FIG. 1 printing machine will be shown hereinafter schematically and their operation described briefly with reference thereto.

Figure 2:
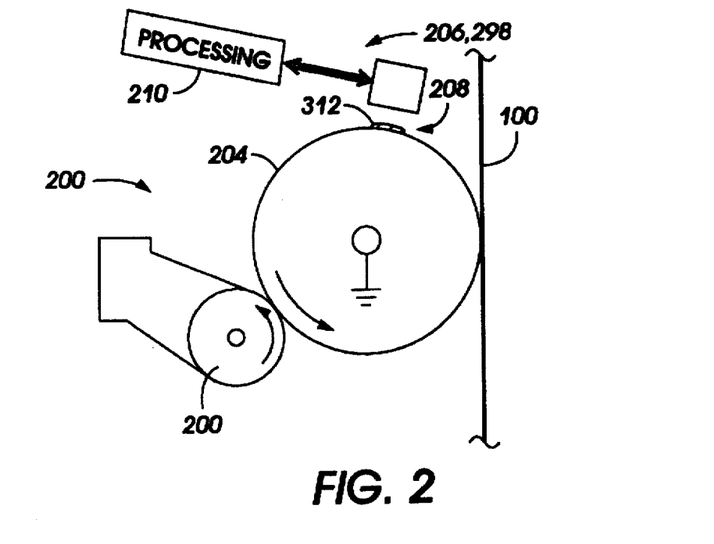
FIG. 2 is an elevational, partially schematic view of a development system operatively coupled with a capacitive based sensing system.

Turning now to FIG. 1 in conjunction with FIG. 2, there is shown a color document imaging system incorporating the present invention. The color copy process can begin by inputting a computer generated color image into the image processing unit 44. A digital signal which represent the blue, green, and red density signals of the image are converted in the image processing unit into four bitmaps: yellow (Y), cyan (C), magenta (M), and black (Bk). The bitmap represents the value of exposure for each pixel, the color components as well as the color separation. Image processing unit 44 may contain a shading correction unit, an undercolor removal unit (UCR), a masking unit, a dithering unit, a gray level processing unit, and other imaging processing subsystems known in the art. The image processing unit 44 can store bitmap information for subsequent images or can operate in a real time mode.

The photoconductive member, preferably a belt of the type which is typically multilayered and has a substrate, a conductive layer, an optional adhesive layer, an optional hole blocking layer, a charge generating layer, a charge transport layer, and, in some embodiments, an anti-curl backing layer. It is preferred that the photoconductive imaging member employed in the present invention be infrared sensitive. This allows improved transmittance through cyan image. Belt 100 is charged by charging unit 101a. Raster output scanner (ROS) 20a, controlled by image processing unit 44, writes a first complementary color image bitmap information by selectively erasing charges on the belt 100. The ROS 20a writes the image information pixel by pixel in a line screen registration mode. It should be noted that either discharged area development (DAD) can be employed in which discharged portions are developed or charged area development (CAD) can be employed in which the charged portions are developed with toner. After the electrostatic latent image has been recorded, belt 100 advances the electrostatic latent image to development station 103a. Liquid developer material is supplied by replenishing systems through tube 209 to development station 103a, fountain 16A advances a liquid developer material 13a from a chamber of housing 14a to development zone 17a, where it meets roller 11 rotating. Roller 11 (including rollers 11a, 11b, 11c and 11d) is electrically biased to generate a DC field, or AC field with DC offset just prior to the entrance to development zone 17a so as to disperse the toner particles substantially uniformly throughout the liquid carrier. The toner particles, disseminated through the liquid carrier, pass by electrophoresis to the electrostatic latent image. The charge of the toner particles is opposite in polarity to the charge on the photoconductive surface.

After the image is developed it is conditioned at development station 103a. Development station 103a also includes porous roller 18a having porous outer skin. Roller 18a receives the developed image on belt 100 and conditions the image by reducing fluid content while inhibiting the offset of toner particles from the image, and by compacting the toner particles of the image. Thus, an increase in percent solids is provided to the developed image, thereby improving the stability of the developed image. Preferably, the percent solids in the developed image is increased to more than 20 percent solids. Porous roller 18a operates in conjunction with a vacuum (not shown) for removal of liquid from the roller. A roller (not shown), in pressure against the blotter roller 18a, may be used in conjunction with or in the place of the vacuum, to squeeze the absorbed liquid carrier from the blotter roller for deposit into a receptacle. Furthermore, the vacuum assisted liquid absorbing roller may also find useful application where the vacuum assisted liquid absorbing roller is in the form of a belt, whereby excess liquid carrier is absorbed through an absorbent foam layer. A belt used for collecting excess liquid from a region of liquid developed images is described in U.S. Pat. Nos. 4,299,902 and 4,258,115, the relevant portions of which are hereby incorporated by reference herein.

In operation, roller 18a rotates in direction 20 to impose against the "wet" image on belt 100. The porous body of roller 18a absorbs excess liquid from the surface of the image through the skin covering pores and perforations. The vacuum 19 located on one end of the central cavity of the roller, draws liquid that has permeated through roller 18a out through the cavity and deposits the liquid in a receptacle or some other location which will allow for either disposal or recirculation of the liquid carrier to the replenishing system of the present invention. Porous roller 18a, discharged of excess liquid, continues to rotate for providing a continuous absorption of liquid from image on belt 100. The image on belt 100 advances to lamp 34a where any residual charge left on the photoconductive surface is extinguished by flooding the photoconductive surface with light from lamp 34a.

The development takes place for the second color, for example, magenta, as follows: the developed latent image on belt 100 is recharged with charging unit 100a. The developed latent image is re-exposed by ROS 20b. ROS 20b superimposing a second color image bitmap information over the previous developed latent image. At development station 103b, roller 11b, rotating in the direction of arrow 12, advances a liquid developer material 13 from the chamber of housing 14b to development zone 17b. Fountain 16b positioned before the entrance to development zone 17b disperses the toner particles substantially uniformly throughout the liquid carrier. The toner particles, disseminated through the liquid carrier, pass by electrophoresis to the previous developed image. The charge of the toner particles is opposite in polarity to the charge on the previous developed image. Roller 18b receives the developed image on belt 100 and conditions the image by reducing fluid content while inhibiting the departure of toner particles from the image, and by compacting the toner particles of the image. Preferably, the percent solids is more than 20 percent, however, the percent of solids can range between 15 percent and 40 percent. The image on belt 100 advances to lamps 34b where any residual charge left on the photoconductive surface is extinguished by flooding the photoconductive surface with light from lamp 34b.

The resultant image, a multi layer image by virtue of the developing station 103a, 103b, 103c and 103d having black, yellow, magenta, and cyan, toner disposed therein advances to the intermediate transfer station. It should be evident to one skilled in the art that the color of toner at each development station could be in a different arrangement. The resultant image is electrostatically transferred to the intermediate member by charging device 111. The present invention takes advantage of the dimensional stability of the intermediate member to provide a uniform image deposition stage, resulting in a controlled image transfer gap and improved image registration. Further advantages include reduced heating of the recording sheet as a result of the toner or marking particles being pre-melted, as well as the elimination of electrostatic transfer of charged particles to a recording sheet. Intermediate member 110 may be either a rigid roll or an endless belt having a path defined by a plurality of rollers in contact with the inner surface thereof. The multi-layer image is conditioned by blotter roller 120 which receives the multi level image on intermediate member 110 and conditions the image by reducing fluid content while inhibiting the departure of toner particles from the image, and by compacting the toner particles of the image. Blotter roller 120 conditions the multi layer so that the image has a toner composition of up to 50 percent solids.

Subsequently, multi-layer image, present on the surface of the intermediate member, is advanced through image liquefaction stage B. Within stage B, which essentially encompasses the region between when the toner particles contact the surface of member 110 and when they are transferred to recording sheet 26, the particles are transformed into a tackified or molten state by heat which is applied to member 110 internally or externally. Preferably, the tackified toner particle image is transferred, and bonded, to recording sheet 26 with limited wicking by the sheet. More specifically, stage B includes a heating element 32, which not only heats the external surface of the intermediate member in the region of transfuse nip 34, but because of the mass and thermal conductivity of the intermediate member, generally raises the outer wall of member 110 at a temperature sufficient to cause the toner particles present on the surface to melt. The toner particles on the surface, while softening and coalescing due to the application of heat from the exterior of member 110, maintain the position in which they were deposited on the outer surface of member 110, so as not to alter the image pattern which they represent. The member continues to advance in the direction of arrow 22 until the tackified toner particles reach transfusing stage C. At transfuse nip 34, the liquefied toner particles are forced, by a normal force N applied through backup pressure roll 36, into contact with the surface of recording sheet 26. Moreover, recording sheet 26 may have a previously transferred toner image present on a surface thereof as the result of a prior imaging operation, i.e. duplexing. The normal force N, produces a nip pressure which is preferably about 100 psi, and may also be applied to the recording sheet via a resilient blade or similar spring-like member uniformly biased against the outer surface of the intermediate member across its width.

As the recording sheet passes through the transfuse nip the tackified toner particles wet the surface of the recording sheet, and due to greater attractive forces between the paper and the tackified particles, as compared to the attraction between the tackified particles and the liquid-phobic surface of member 110, the tackified particles are completely transferred to the recording sheet as image marks. Furthermore, as the image marks were transferred to recording sheet 26 in a tackified state, they become permanent once they are advanced past transfuse nip and allowed to cool below their melting temperature. The transfusing of tackified marking particles has the further advantage of only using heat to pre-melt the marking particles, as opposed to conventional heated-roll fusing systems which must not only heat the marking particles, but the recording substrate on which they are present.

After the developed image is transferred to intermediate member 110, residual liquid developer material remains adhering to the photoconductive surface of belt 100. A cleaning roller 31 formed of any appropriate synthetic resin, is driven in a direction opposite to the direction of movement of belt 100 to scrub the photoconductive surface clean. It is understood, however, that a number of photoconductor cleaning means exist in the art, any of which would be suitable for use with the present invention. Any residual charge left on the photoconductive surface is extinguished by flooding the photoconductive surface with light from lamp 34d.

As will be recognized by those skilled in the art, the developer application subsystem described above can be implemented in a number of different approaches without affecting the concept upon which the currently described embodiments are based. Referring to FIG. 2, another embodiment of a developer application subsystem is designated by the numeral 200. The subsystem 200 includes a donor roll 202 which provides developer material to a developer application roll 204. In one example, developer material is provided from the donor roll by turning a motor (not shown) on and off. The application roll 204 serves as a ground plane for use in a capacitive sensing subsystem designated by the numeral 206. The capacitive sensing subsystem, which includes a sensing circuit 208 and a processing circuit 210, will be discussed in further detail below.

Prior to proceeding with a discussion of the circuitry used to implement the capacitive sensing subsystem 206 a discussion of capacitance sensing is provided. General capacitance sensing of thickness and other parameters is relatively simple. A stable oscillator is fed to the unknown capacitance through a series reference capacitor. The resulting output voltage across the unknown capacitance is inversely proportional to the unknown capacitance (a capacitance divider). The output waveform contains a wealth of information about what occurs between the unknown capacitor's plates. Anything that changes the spacing between the plates or the dielectric strength will affect the capacitance measurement. The relationship between spacing, dielectric strength and capacitance is $$C = (\epsilon A)/d$$

Where:
C=Capacitance
ε=Dielectric strength
A=Surface area of the plates
d=Spacing between plates Referring to FIG. 3, one embodiment of the capacitive sensing subsystem 206 is shown in greater detail. The illustrated embodiment of FIG. 3 includes an oscillator 214, a capacitive divider 216, a peak hold circuit 218, a reference level setter 220 and an amplifier 222. In practice, the oscillator 214 operates as a square wave oscillator running at, in one example, 40 kHz. Output of the oscillator is communicated to the capacitive divider including capacitors 226, 228. A measuring node 230 is shifted as a function of change between the plates 232 (the surface of the roll 204) and 234 (a plate associated with the sensing circuit 208) of capacitor 228. Preferably, a 40 kHz 10.0 v peak to peak square wave is used to drive the capacitors 226, 228 and the fraction of the total square wave across the unknown capacitance is processed. The peak or peak to peak value(s) of the voltage across the unknown capacitance is "grabbed" with the peak hold circuit 218, an offset is removed with the reference level setter 220, and the remaining signal is amplified with the amplifier 222.

Figure 3:
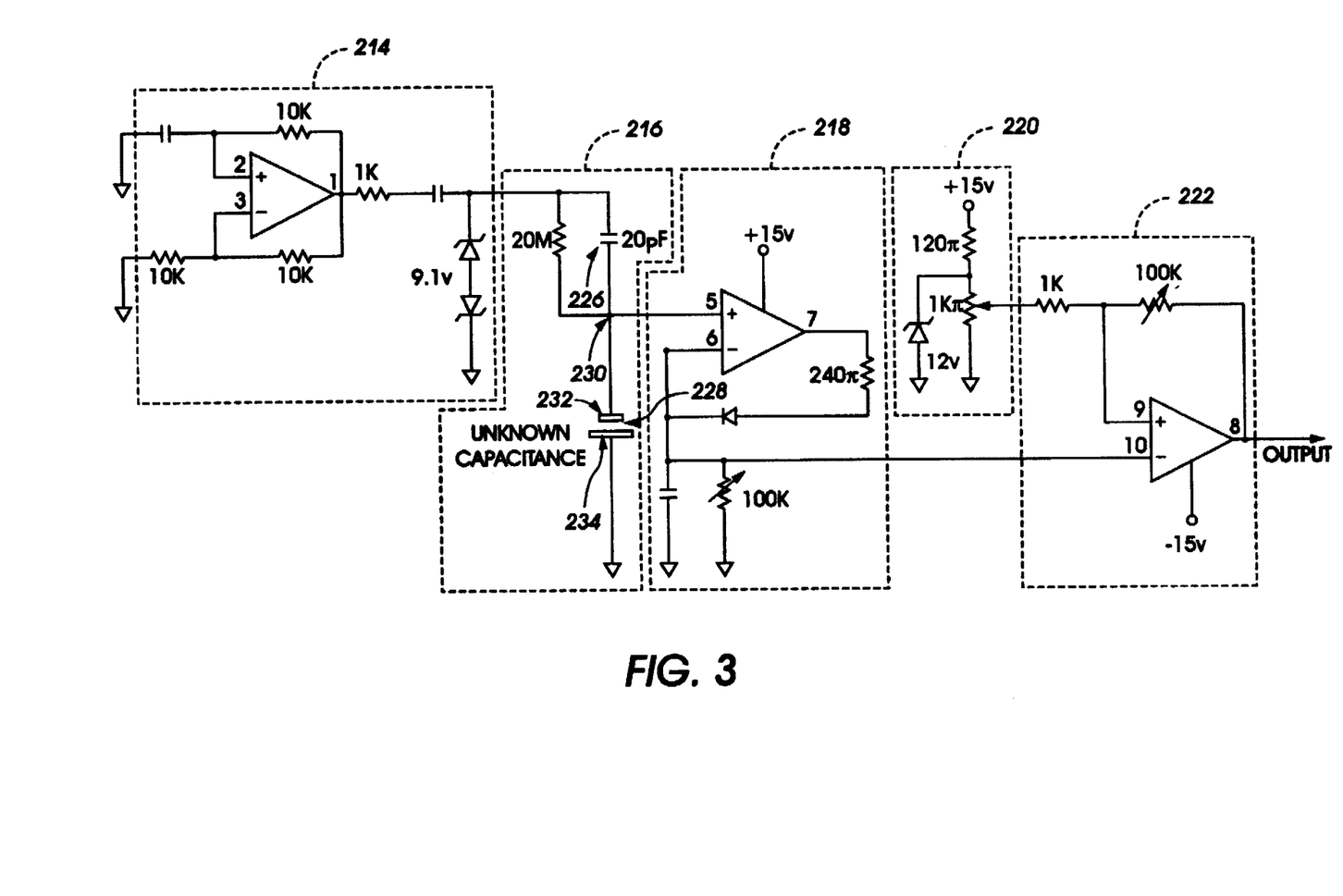
FIG. 3 shows circuitry suitable for implementing at least part of the capacitive based sensing system.
Figure 4:
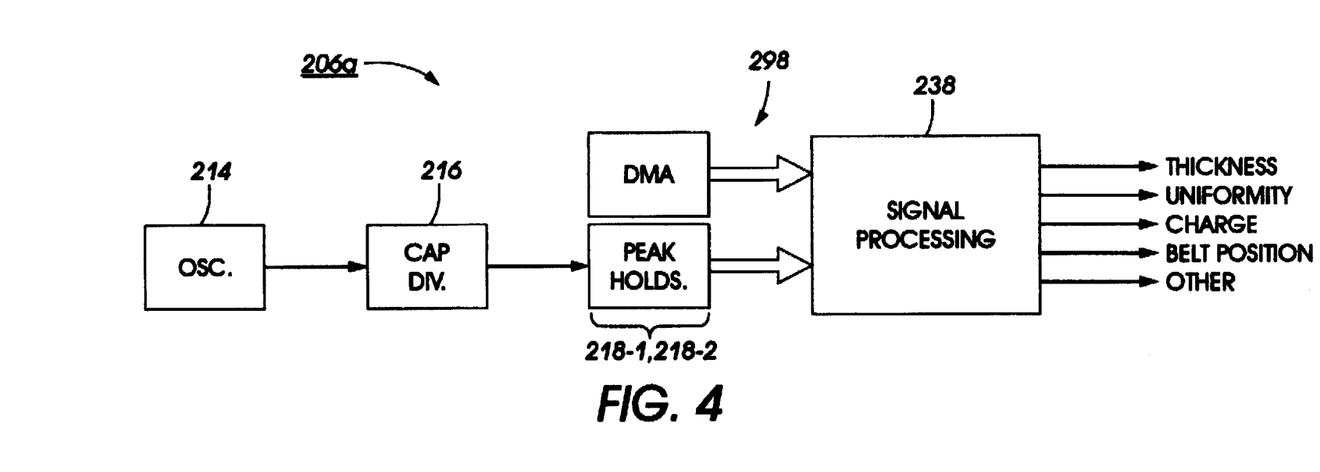
FIG. 4 is a block diagram of a preferred arrangement for the capacitive based sensing system.

Referring to FIG. 4, a preferred embodiment of the capacitive sensing subsystem 206 is designated with the numeral 206a. The preferred embodiment of FIG. 4 includes the oscillator 214, the capacitive divider 216 and peak holds 218-1 and 218-2. Essentially, as will appear below, the plurality of peak holds, only one of which is shown in FIG. 3, permit signal processing 238 to generate a plurality of output signals. Referring to the output signals of FIG. 4, further discussion regarding thickness, uniformity and charge related signals is provided below. With respect to belt position detection, as the edge of a belt (e.g. photoreceptive belt 100 of FIG. 1) moves laterally in and out between two conductive plates, the change in dielectric constant between the belt and air is measured. The resultant capacitance measured will change proportionately with belt position. In one example the peak holds and signal processing capability are implemented on a suitable standard platform, such as a personal computer.

Figure 5:
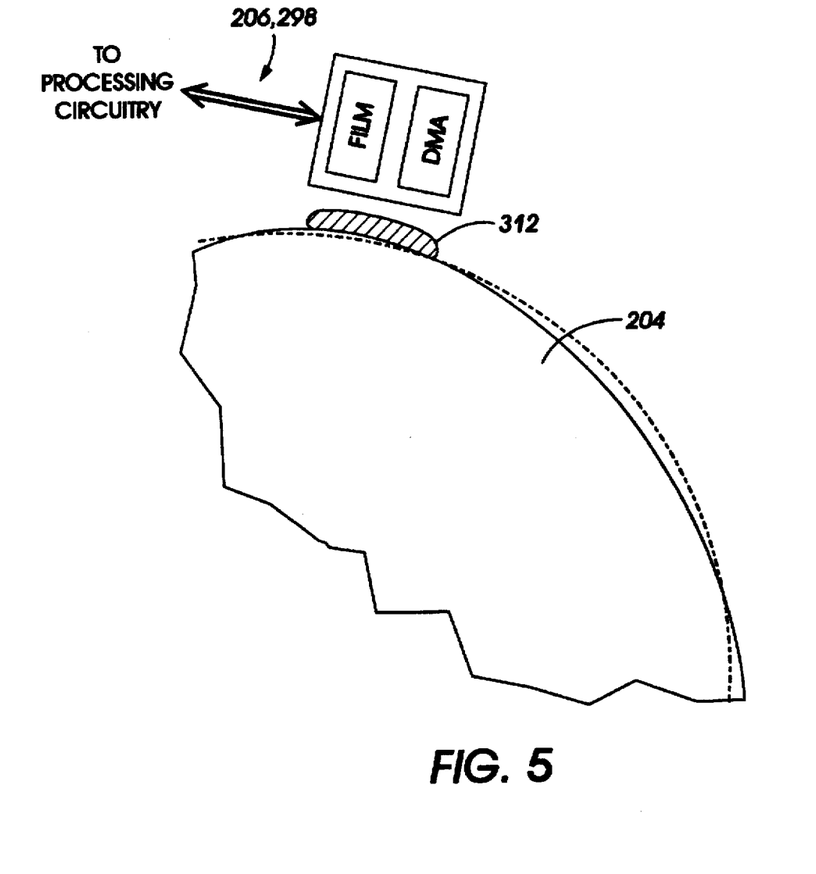
FIG. 5 is a partial view of a drum with a nonuniform cross-section and a discrete amount of developer material disposed thereon.
Figure 6:
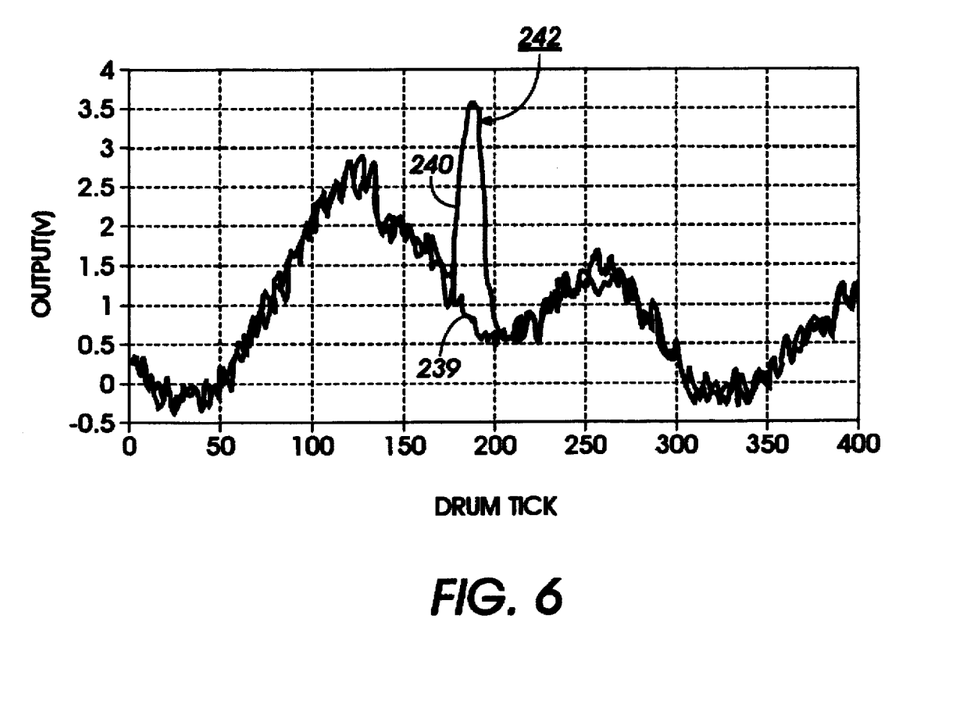
FIG. 6 is a graph showing experimental results obtained through operation of the arrangement of FIG. 2.

Referring to FIG. 5, further discussion regarding roll or drum uniformity measurement is provided. It is understood that many rollers or drums are not perfectly uniform in that they are not necessarily round. In some instances, a roller may have a dome-like portion as shown by the illustrated embodiment of FIG. 5. As will be appreciated, such non-uniformity causes an inaccurate fluctuation in capacitance because the value of d (see relationship for C above) varies from what would be expected if a cross section of the drum were circular throughout. Referring to FIG. 6, the results of an experiment, in which measurements of drum run out (i.e. an indicator of drum roundness) were obtained with the capacitive sensing subsystem 206, are shown. In the illustrated graph of FIG. 6, "drum tick" represents the extent to which the drum has rotated about a reference plane. In one example, 400 drum ticks are equal to about one revolution of the drum.

For the experiment of FIG. 6, first curve 239 and second curve 240 are generated by rotating the application roll 204 (FIG. 2) through two revolutions. During the first revolution, the roll 204 is run through a "clean" cycle in which only drum uniformity or drum run out is monitored. As should be recognized, through much of the first revolution, the values representative of output are above zero. During the second revolution, some liquid developer was squirted on the roll 204 and when the roll reached the capacitive sensing subsystem 206, a corresponding spike resulted. It should be appreciated that this experiment demonstrates an advantage of the disclosed system in that the second curve can be normalized on the basis of the first curve to accommodate for the presence of drum run out. This normalization is enabled through use of relatively high frequency with the oscillator (FIG. 3), such use permitting accurate drum phase synchronization.

Figure 7:
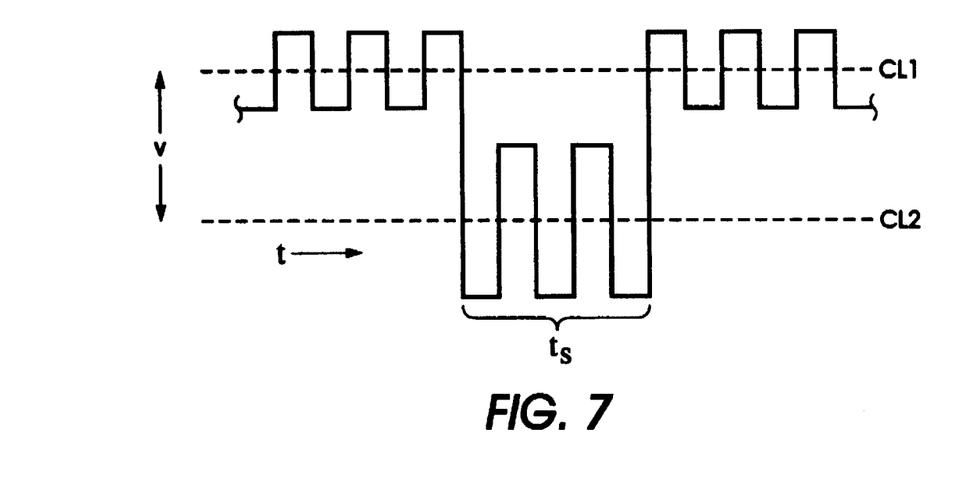
FIG. 7 is a pulse train demonstrating results obtained through the operation of an arrangement such as that shown in FIG. 2.
Figure 8:
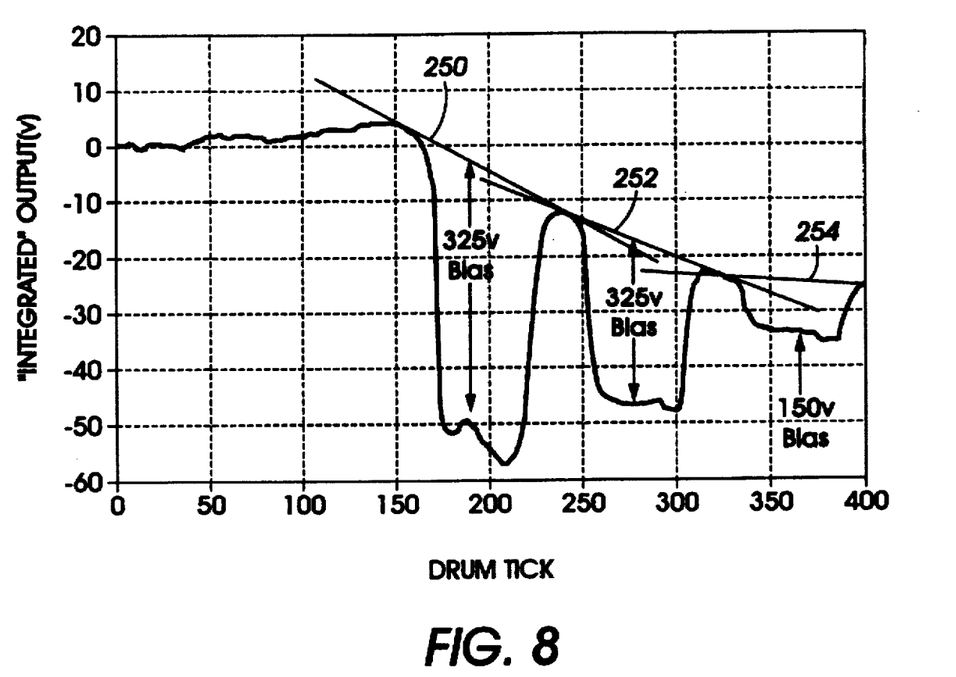
FIG. 8 is a graph of "integrated" results obtained through alternative operation of the arrangement of FIG. 2.

Referring to FIGS. 7 and 8, a discussion of how the preferred embodiment can be used to measure both developer thickness and electrostatic voltage (i.e. charge) is provided. Referring first to FIG. 7, a pulse train, representative of roll or drum voltage for a clean cycle, is characterized by a first centerline, namely "CL1". During the squirt test, the pulse train reflects a change in voltage, during $t_r$, corresponding to a change in peak or peak to peak voltage. It has been found that utilization of peak holds to grab voltages reflecting a voltage from the clean cycle and a voltage during the squirt cycle represents at least one contemplated approach for obtaining a capacitive measurement that is normalized for drum run out. Additionally, during $t_s$, the voltage is shifted in accordance with a second centerline, namely "CL2". It has been found that a measurement of the shift between CL1 and CL2 provides a value representative of electrostatic voltage, which value may be useful in setting a bias voltage for application to the application roll 204.

Referring to FIG. 8, an alternative approach to measuring both developer thickness and electrostatic voltage is described. The curve of FIG. 8 shows "integrated" results for the capacitive sensing subsystem 206 where the integration was achieved by simply summing data points as they were collected during a single pass of the roll 204. Three different bias potentials were used on each pass of the roll to develop different test patches for developed mass per area (DMA). In the illustrated embodiment of FIG. 8, the slope of lines 250, 252 and 254 represent the patch or developer thickness while the area of the "bucket" under those lines represent the charge level of the patch.

Figure 9:
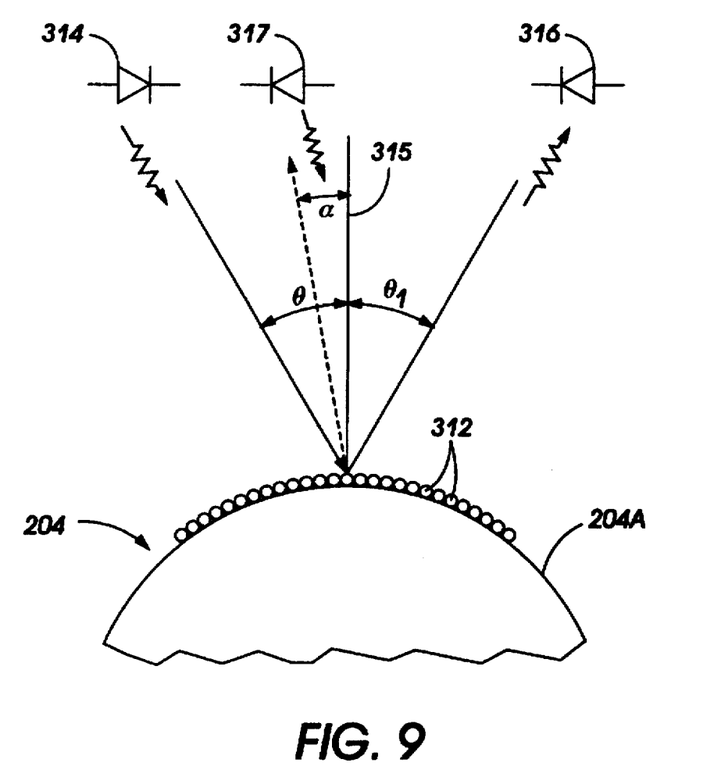
FIG. 9 is a somewhat schematic view of a sensor and light source combination for use in detecting the diffuse component of reflection from a toner/imaging surface combination.

Referring to FIG. 9, a basic geometric arrangement of a colored toner DMA sensor is shown. As used herein, specular reflection refers to that portion of reflected light wherein the angle of reflection is equal to the angle of incidence, and which for an incident beam of collimated light exhibits an angular distribution which is sharply peaked about the specular reflection angle. Diffuse reflection refers to light reflected at angles predominantly other than the specular reflection angle and which for an incident beam of collimated light, exhibits a broad and perhaps isotropic angular distribution.

In the illustrated embodiment of FIG. 9, the roll 204 (FIG. 2), bearing a developed mass of colored toner 312 on a surface 204a thereof, is illuminated with light source 314 of a selected wavelength. For most colored toners and reflective surfaces of the type associated with belt 100 or roll 204, a suitable light emitting diode produces a satisfactory wavelength of light for this purpose. For discussion purposes, light source 314 is placed at an angle θ with respect to the normal (indicated by 315) to the roll surface 204a. Accordingly, the specular component of reflected light would be viewed at an angle $θ_1$, equal in magnitude and opposite in sign to angle θ, and located in the imaginary planes defined by the normal 315 to surface 204a, and the position of light source 314. In practice, photodiode 316 is located along the specular reflection angle for the purpose of sensing light absorbing toner DMA, calibration, or for comparison of clean surface response with the colored toner sensor that will be described.

In accordance with the illustrated embodiment of FIG. 9, light diffusely reflected from the illuminated toner/imaging surface combination is detected, with a light detector 317.

Preferably, light detector 317 is arranged at an angle α, with respect to the normal 315 in such a way that will not provide detection of the specular component of reflection. The light detector, which may be a photodiode or other illumination responsive device, produces an output in response to detected intensity of diffusely reflected light, where increasing density of toner on roll surface 204a (i.e., increasing DMA) produces increasing intensity of diffusely reflected light.

The angle selected for supporting the diffusely reflected light detector with respect to the light source is based on several factors, including the availability of space, nearness of the light detector to the light source so that sensed light intensity is reasonably measurable, and the desire to provide an optical design that will provide latitude in positioning the sensor relative to the substrate. In comparison to specularly reflected light, the intensity of diffusely reflected light is somewhat less, perhaps suggesting that the output of the light source might be increased, or that careful selection of the position of the light detector is important. Assuming functionality, i.e., that the light detector selected can detect diffuse reflection, there really is no limit to the position of light detector 317 other than the requirement that it not be positioned at the specular reflection angle.

Figure 10:
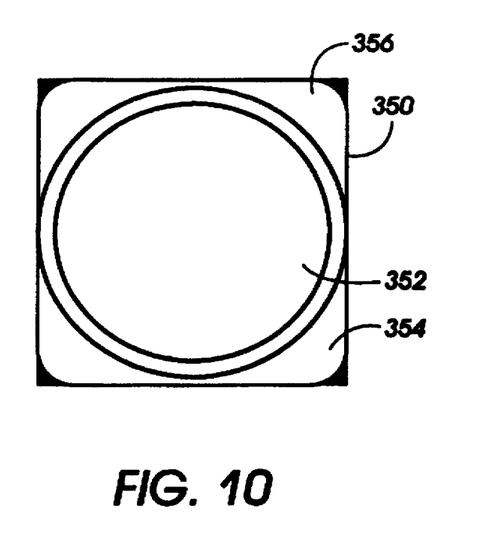
FIGS. 10 and 11 comprise a toner area coverage sensor for sensing both the specular component of light and the diffuse component of light, and a circuit for producing a signal indicative of sensed DMA.
Figure 11:
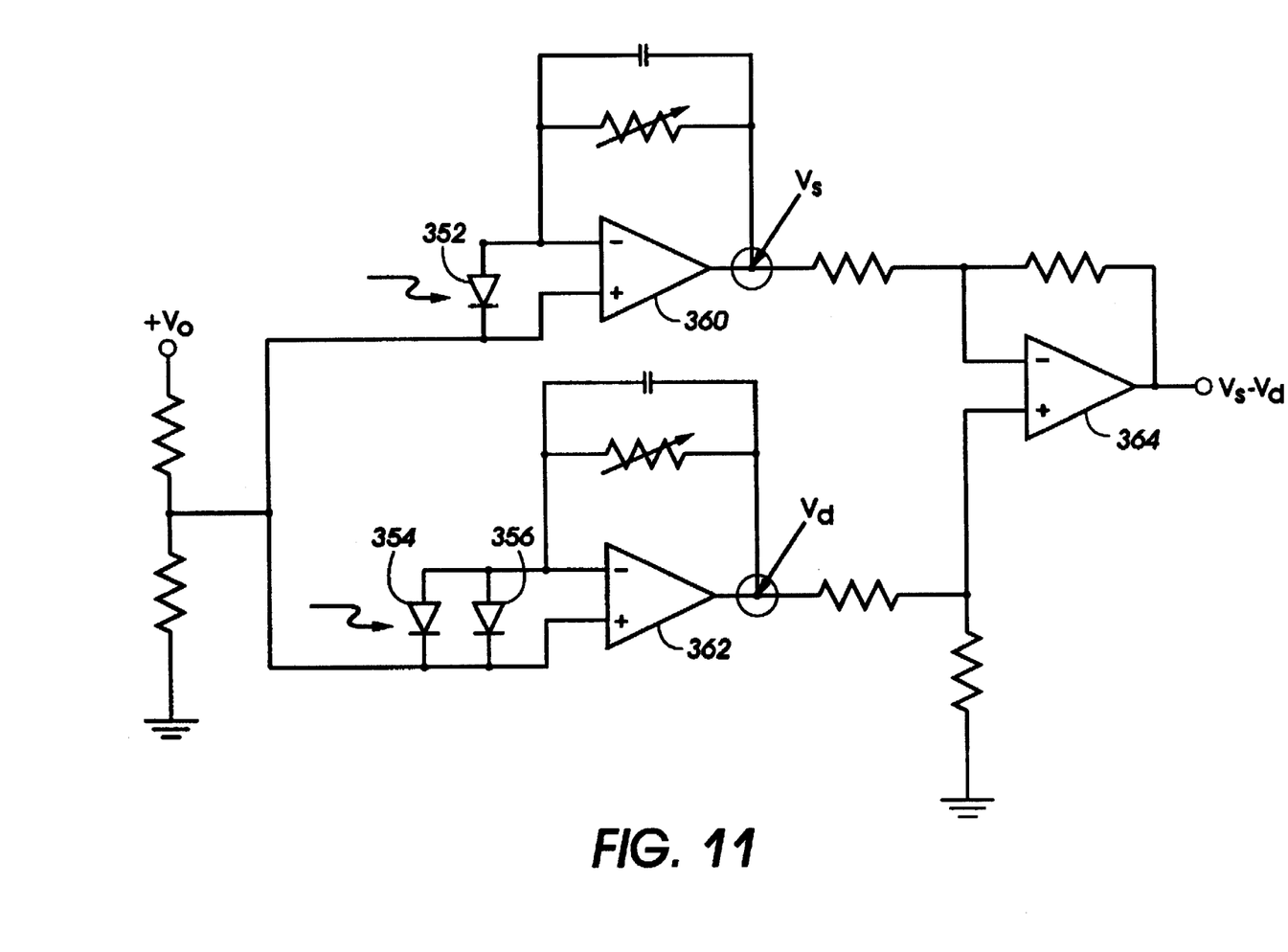

In one possible embodiment, shown in FIGS. 10 and 11, a photodiode, as described in U.S. Pat. No. 4,989,985 to Hubble III et al. the disclosure of which is incorporated herein by reference, originally designed for a specularly reflecting light detector for DMA sensing is adapted for sensing diffusely reflected light for colored toner DMA sensing. In its use as a DMA sensor for black toners, the described sensor would normally employ a differential amplifier to separate the diffuse reflection component of the signal acquired at a center photodiode, by subtracting the signal of the edge photodiodes from the signal of the center photodiode. Segmented photodiode 350 is partitioned into a center photodiode 352 and edge photodiodes 354 and 356. Center photodiode 352 detects a combination of specularly reflected and diffusely reflected light. However, the response of edge photodiodes 354 and 356 is separately acquired for the detection of diffusely reflected light. Thus, the photodiode may be centered with the center photodiode 352 at the angle of specular reflection, which places the edge photodiodes 354 and 356 at diffuse reflection angles.

FIG. 11 gives a suggestion for a circuit for driving the photodiodes. Generally, center photodiode 352, and edge photodiodes 354 and 356 provide a signal to operational amplifiers 360 and 362 to produce signals $V_s$ (combined specularly and diffusely reflected light) and $V_D$ (diffusely reflected light), respectively, for the production of an output appropriate for whatever control operations will be accomplished in response to sensor information. If required, described sensor employs a differential amplifier 364 to separate the diffuse reflection component of the signal acquired at a center photodiode 352, by subtracting the signal of the edge photodiodes 354 and 356 from the signal of the center photodiode.

The following discussion will clarify how the respective results of capacitive sensing subsystem 206 and DMA sensing subsystem 298 are employed to obtain a value of percentage solids for the liquid developer disposed on the roll 204. It is understood that:

% Solids=Toner Mass/Total Ink Mass

Noting that,

Toner Mass=DMA×Surface Area (upon which developer material is applied)

and that,

Total Ink Mass=Film Thickness×Surface Area×Density (of the developer material)

it follows:

% Solids=DMA/(Film Thickness×Density)     (1)

With this resulting expression (1) and a given value of density it is a straightforward matter for determining a value of percentage solids with the sensing arrangement of FIG. 4. In particular, the given density is provided to signal processing 238 in advance of or pursuant to the value determination, and upon obtaining a value for Film Thickness (from 206a) and DMA (from DMA sensing subsystem 298), a value for Percentage Solids is determined readily with signal processing 238. As will be understood, when the value for Percentage Solids varies from a selected reference, the developer application subsystem (FIGS. 1 and 2) can be adjusted suitably to bring the level of Percentage Solids back within an acceptable range.

Numerous features of the above-described embodiments will be appreciated by those skilled in the art:

First, by obtaining a measurement of Percentage Solids, optimum operation of a liquid ink development system can be obtained. That is, waste of solids is minimized so that no more liquid developer material is used than necessary.

Second, Percentage Solids, in the preferred embodiment, is measured in a straightforward and easy manner. Only two measurements are required in determining Percentage Solids and those two measurements are made with a minimum amount of components and attendant procedure.

Finally, the two measurements can be obtained with a convenient sensing arrangement integrating two sensors into a cost effective package. Moreover, other appropriate circuitry, such as a signal processing subsystem, can be included in the package so that unit machine cost of the sensing arrangement is minimized.

What is claimed is:

1. In a printing system with a liquid developer material application member for receiving liquid developer material containing solids for application of the liquid developer material to a selected surface, the liquid developer material, when disposed on the developer application member as a film being characterized by a first value varying as a function of developed mass per unit area (DMA) and a second value varying as a function of film thickness, a system for measuring a percentage of the solids in the liquid developer material, comprising:

a first sensing system for determining a magnitude corresponding with the first value;

a second sensing system for determining a magnitude corresponding with the second value; and a controller, responsive to said first and second sensing systems, for determining the percentage of the solids in the liquid developer material with the determined first and second values, wherein said controller determines the percentage of solids in the liquid developer material with the following relationship:

Percentage Solids=DMA/(Film Thickness×Density of Liquid Developer Material).

2. The measuring system of claim 1, wherein said second sensing system includes:

a light source to illuminate liquid developer material disposed on the liquid developer material application member so that light of a selected wavelength is reflected therefrom; and a light detector for detecting the intensity of light of the selected wavelength reflected from the liquid developer material and the liquid developer material application member.

3. The measuring system of claim 1, in which the printing system includes a photoreceptive member for receiving at least a portion of the liquid developer material, wherein the liquid developer application member comprises a drum disposed adjacent the photoreceptive member.

4. The measuring system of claim 1, wherein said first and second sensing systems are disposed adjacent one another to form a composite sensing arrangement.

5. The measuring system of claim 1, wherein the percentage of solids in the liquid developer material is adjusted when it is determined, with said controller, that the percentage of the solids in the liquid developer material varies from a reference value by a selected amount.

6. In a printing system with a liquid developer material application member for receiving liquid developer material containing solids for application of the liquid developer material to a selected surface, the liquid developer material, when disposed on the developer application member as a film being characterized by a first value varying as a function of developed mass per unit area (DMA) and a second value varying as a function of film thickness, the liquid developer application member being characterized by a capacitance when liquid developer material is disposed thereon and the capacitance being represented by a signal, a system for measuring a percentage of the solids in the liquid developer material, comprising:

a first sensing system for determining a magnitude corresponding with the first value, wherein said first sensing system determines the magnitude corresponding with the first value by specific reference to the capacitance;

a second sensing system for determining a magnitude corresponding with the second value;

a controller, responsive to said first and second sensing systems, for determining the percentage of the solids in the liquid developer material with the determined first and second values; and wherein the signal is normalized to accommodate for nonuniformity in the liquid developer material application member.

7. In a printing system with a liquid developer material application member for receiving liquid developer material containing solids for application of the liquid developer material to a selected surface, the liquid developer material, when disposed on the developer application member as a film being characterized by a first value varying as a function of developed mass per unit area (DMA) and a second value varying as a function of film thickness, a method for measuring a percentage of the solids in the liquid developer material, comprising:

a) determining a first magnitude corresponding with the first value;

b) determining a second magnitude corresponding with the second value; and c) receiving the first and second magnitudes, with a controller, for determining the percentage of the solids in the liquid developer material, wherein said c) includes determining the percentage of solids in the liquid developer material with the following relationship:

Percentage Solids=DMA/(Film Thickness×Density of Liquid Developer Material).

8. The method of claim 7, wherein said b) includes:

illuminating liquid developer material disposed on the liquid developer material application member so that light of a selected wavelength is reflected therefrom; and detecting the intensity of light of the selected wavelength reflected from the liquid developer material and the liquid developer material application member.

9. The method of claim 7, further comprising using a composite sensing arrangement to perform said a) and b).

10. The method of claim 7, further comprising adjusting the percentage of solids in the liquid developer material when it is determined, with said c), that the percentage of solids in the liquid developer varies from a reference value by a selected amount.

11. In a printing system with a liquid developer material application member for receiving liquid developer material containing solids for application of the liquid developer material to a selected surface, the liquid developer material, when disposed on the developer application member as a film being characterized by a first value varying as a function of developed mass per unit area (DMA) and a second value varying as a function of film thickness, the liquid developer application member being characterized by a capacitance when liquid developer material is disposed thereon and the capacitance being represented by a signal, a method for measuring a percentage of the solids in the liquid developer material, comprising:

a) determining a first magnitude corresponding with the first value;

b) determining a second magnitude corresponding with the second value, wherein said a) includes determining the first magnitude by specific reference to the capacitance;

c) receiving the first and second magnitudes, with a controller, for determining the percentage of the solids in the liquid developer material; and d) normalizing the signal to accommodate for nonuniformity in the liquid developer material application member.

* * * * *